(12) United States Patent
Lioy et al.

(10) Patent No.: US 6,377,556 B1
(45) Date of Patent: Apr. 23, 2002

(54) METHOD AND APPARATUS TO RESYNCHRONIZE PPP ON $U_M$ INTERFACE WITHOUT AFFECTING PPP ON A $R_M$ INTERFACE AND TO RESYNCHRONIZE PPP ON A $R_M$ INTERFACE WITHOUT AFFECTING PPP ON A $U_M$ INTERFACE

(75) Inventors: Marcello Lioy; Nischal Abrol, both of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/353,107

(22) Filed: Jul. 14, 1999

(51) Int. Cl.[7] .......................... H04B 7/00; H04B 7/212; H04B 7/216; H04J 3/06; H04J 3/22
(52) U.S. Cl. .......................... 370/310; 370/324; 370/350
(58) Field of Search ................................. 370/310, 313, 370/324, 328, 331, 335, 350, 469, 503

(56) References Cited

U.S. PATENT DOCUMENTS 5,970,059 A * 10/1999 Ahoplto et al. ............. 370/338
5,978,386 A * 11/1999 Hamalainen et al. ........ 370/466
6,111,866 A * 8/2000 Kweon et al. ............... 370/335

FOREIGN PATENT DOCUMENTS

EP        0 494 576 A1      7/1992

* cited by examiner

Primary Examiner—Dang Ton
Assistant Examiner—Toan Nguyen
(74) Attorney, Agent, or Firm—Philip R. Wadsworth; Charles D. Brown; George C. Pappas

(57) ABSTRACT

A method, within a wireless communication system, and a wireless MT2 device which provide for the resynchronization of a PPP link on each one of a $U_m$ and $R_m$ interface without affecting the other of the $U_m$ and $R_m$ interface. When a handoff is performed, such that the communications of the mobile MT2 device is handed off to a new BS/MSC, the $U_m$ interface will undergo PPP configuration renegotiation without causing the $R_m$ interface also to undergo PPP configuration renegotiation. Similarly, when the $R_m$ interface undergoes PPP configuration renegotiation, the $U_m$ interface will not undergo PPP configuration renegotiation.

24 Claims, 6 Drawing Sheets

METHOD AND APPARATUS TO RESYNCHRONIZE PPP ON $U_M$ INTERFACE WITHOUT AFFECTING PPP ON A $R_M$ INTERFACE AND TO RESYNCHRONIZE PPP ON A $R_M$ INTERFACE WITHOUT AFFECTING PPP ON A $U_M$ INTERFACE

BACKGROUND OF THE INVENTION

I. Field of the Invention

The present invention relates to the field of wireless data services. More particularly, the present invention relates to a novel and improved method and system for resynchronizing a Point-to-Point Protocol (PPP) link over a $U_m$ interface between a wireless communication device (MT2) and a base station/mobile switching center (BS/MSC) without affecting a $R_m$ interface between the wireless communication device (MT2) and a TE2 device.

II. Description of Related Art

Internetworking, i.e., the connection of individual local area networks (LANs), has rapidly become very popular. The infrastructure and associated protocols commonly referred to as the "Internet" have become well known and widely used. A well known protocol for providing access to the Internet is the Point-to-Point Protocol (PPP) which provides a standard method for transporting multi-protocol datagrams over point-to-point, and is further described in Request for Comment (RFC) 1661, Network Working Group, W. Simpson, Editor, July 1994, herein incorporated by reference.

PPP includes three main components:
1. a method of encapsulating multi-protocol datagrams;
2. a Link Control Protocol (LCP) for establishing, configuring, and testing a data link connection; and
3. a family of Network Control Protocols (NCPs) for establishing and configuring different network-layer protocols.

FIG. 1 illustrates a high-level block diagram of a wireless data communication system in which a mobile terminal (TE2 device) 102 communicates with an interworking function (IWF) 108 via a wireless communication system which includes a wireless communication device (MT2) 104 and Base Station/Mobile Switching Center (BS/MSC) 106. In FIG. 1, the IWF 108 serves as the access point to the Internet. IWF 108 is coupled to, and often co-located with BS/MSC 106, which may be a conventional wireless base station, as is known in the art. TE2 device 102 is coupled to MT2 device 104 (which may be a cellular phone), which is in wireless communication with BS/MSC 106 and IWF 108.

Many protocols exist which allow data communication between the TE2 device 102 and the IWF 108. For example, Telecommunications Industry Association (TIA)/Electronics Industries Association (EIA) Interim Standard IS-707.5, entitled "Data Service Options for Wideband Spread Spectrum Systems: Packet Data Services," published February 1998, and herein incorporated by reference, defines requirements for support of packet data transmission capability on TIA/EIA IS-95 wideband spread spectrum systems, of which BS/MSC 106 and IWF 108 may be a part. IS-707.5 also provides the requirements for communication protocols on the links between the TE2 device 102 and the MT2 device 104 (the $R_m$ interface), between the MT2 device 104 and the BS/MSC 106 (the $U_m$ interface), and between the BS/MSC 106 and the IWF 108 (the L interface).

Referring now to FIG. 2, a diagram of the protocol stacks in each entity of the IS-707.5 Relay Model is shown. FIG. 2 corresponds roughly to FIG. 1.4.2.2-1 of IS-707.5. At the far left of the figure is a protocol stack, shown in conventional vertical format, showing the protocol layers running on the TE2 device 102 (e.g., the mobile terminal, laptop or palmtop computer). The TE2 protocol stack is illustrated as being logically connected to the MT2 device 104 protocol stack over the $R_m$ interface. The MT2 device 104, is illustrated as being logically connected to the BS/MSC 106 protocol stack over the $U_m$ interface. The BS/MSC 106 protocol stack is, in turn, illustrated as being logically connected to the IWF 108 protocol stack over the L interface.

As an example of the operation of the protocols of FIG. 2, the Point to Point Protocol ($PPP_R$) protocol 206 encodes packets from the upper layer protocols 202, 204 and transmits them across the $R_m$ interface using the EIA-232 protocol 208 to the EIA-232-compatible port on the MT2 device running the EIA-232 protocol 210. The present invention is not intended to be limited to a system that uses the EIA-232 protocol since, as is well known, other suitable protocols such as USB are also available. The EIA-232 protocol 210 on the MT2 device, receives the packets and passes them to the $PPP_R$ protocol 205. The $PPP_R$ protocol 205 unframes the packets encapsulated in PPP frames and typically, when a data connection is up, passes the packets to $PPP_U$ protocol 215, which frames the packets in PPP frames for transmission to a PPP peer located in the IWF (108). The Radio Link Protocol (RLP) 212 and IS-95 protocol 214, both of which are well known in the art, are used to transmit the packets, which are encapsulated in PPP frames, to the BS/MSC 106 over the $U_m$ interface. The RLP protocol 212 is defined in Telecommunications Industry Association (TIA)/Electronics Industries Association (EIA) Interim Standard IS-707.2, entitled "Data Service Options for Wideband Spread Spectrum Systems: Radio Link Protocol", February 1998, herein incorporated by reference, and the IS-95 protocol is defined in IS-95 mentioned above. A complementary RLP protocol 216 and IS-95 protocol 218 in the BS/MSC 106 pass the packets to the relay layer protocol 220 for transmission across the L interface to relay layer protocol 228. $PPP_U$ protocol 226 then unframes the received packets and passes them to the network layer protocols 225, which in turn sends them out on the Internet to the designation server.

As described in RFC 1661, the LCP Packets comprise a Configure-Request, a Configure-Ack, a Configure-Nak, and a Configure-Reject. The format of these packets is well known and described in RFC 1661.

The Configure-Request packet is used to negotiate configuration options. All configuration options are always negotiated simultaneously.

The Configuration-Ack packet is transmitted if every configuration option in a received Configuration-Request packet is recognizable and all values are acceptable.

The Configure-Nak packet is sent in response to a Configuration-Request packet when the requested configuration options are recognizable, but some of the values are not acceptable. The Options field of the Configure-Nak packet are filled only with the unacceptable configuration options from the Configure-Request packet. Note that all configuration options are always Nak'd simultaneously.

The Configure-Reject packet is sent when a received Configure-Request includes configuration options that are unrecognizable or are not acceptable for negotiation. The options field of the Configure-Reject contains only the unacceptable configuration options from the Configure-Request.

The following comprises the well-known configuration options, described in RFC 1661, and defined for the PPP LCP protocol:

1. Maximum-Receive-Unit
2. Authentication-Protocol
3. Quality-Protocol
4. Magic-Number
5. Protocol-Field-Compression
6. Address-and-Control-Field-Compression Internet Protocol Control Protocol (IPCP) is a network control protocol responsible for configuring, enabling, and disabling Internet Protocol (IP) modules on both ends of the PPP link. IPCP is described in Request for Comment (RFC) 1332, "The PPP Internet Protocol Control Protocol (IPCP)", Network Working Group, G. McGregor Merit, May 1992, herein incorporated by reference. IPCP configuration options include:

1. IP-Addresses;
2. IP-Compression-Protocol; and
3. IP-Address

IPCP uses the same option negotiation mechanism as the Link Control Protocol (LCP).

LCP and IPCP Configuration option negotiations occur separately for both the $R_m$ interface and the $U_m$ interface. That is, LCP or IPCP configuration option negotiation over one of the $R_m$ and $U_m$ interfaces is separate from LCP or IPCP configuration option negotiation over the other of the $R_m$ and $U_m$ interfaces. Therefore, the wireless communication device (MT2) must separately negotiate configuration options over the $R_m$ and $U_m$ interfaces.

Because the wireless communication device (MT2) is mobile, the wireless communication device (MT2) may move to an area that is served by a different BS/MSC 106 or a different IWF 108. When this happens, a handoff will occur, handing the MT2 device over to the new BS/MSC 106 or a new IWF 108 for service. When a handoff occurs, the LCP and IPCP links must be renegotiated over the $U_m$ interface, as discussed above. Because PPP negotiation for the $R_m$ and $U_m$ interfaces are independent, PPP renegotiation need only occur on the $U_m$ interface.

Under some circumstances, the TE2 device may initiate PPP renegotiation. However, it may be unnecessary to perform PPP renegotiation on the $U_m$ interface when PPP renegotiation occurs on the $R_m$ interface.

SUMMARY OF THE INVENTION

The invention is a method, within a wireless communication system, and an MT2 device which provide for the resynchronization of a PPP link on one of a $U_m$ and $R_m$ interface without affecting the other of the $U_m$ and $R_m$ interface.

Thus, when a handoff is performed, such that the mobile MT2 device is handed off to a new BS/MSC, the $U_m$ interface may undergo PPP configuration renegotiation without causing the $R_m$ interface also to undergo PPP configuration renegotiation.

Similarly, the $R_m$ interface may undergo PPP configuration renegotiation without causing the $U_m$ interface also to undergo PPP configuration renegotiation.

BRIEF DESCRIPTION OF THE DRAWING

These and other advantages will become more apparent from the detailed description of the preferred embodiments along with the following drawings.

DETAILED DESCRIPTION OF THE PREFERRED EMBODIMENTS

As is known in the art, in order to establish communications over a point-to-point (PPP) link, Link Control Protocol (LCP) packets for establishing, configuring and testing the data link connection must be exchanged over each PPP link, i.e., the $R_m$ and $U_m$ interfaces. Any options not negotiated use a predefined default value, as specified by RFC 1661.

Similarly, IPCP packets for negotiating and configuring IPCP configuration options must be exchanged over the $R_m$ and $U_m$ interfaces. Any options not negotiated use a predefined default value, as specified by RFC 1332.

As described in RFC 1661 and RFC 1332, LCP Packets and IPCP packets comprise a Configure-Request, a Configure-Ack, a Configure-Nak, and a Configure-Reject. The format of these packets is well known and described in RFC 1661 and RFC 1332, respectively.

Configuration option negotiations may occur separately for both the $R_m$ interface and the $U_m$ interface. As described in RFC 1661 and RFC 1332, the Configure-Request packet contains a list of the options being requested and the Configuration-Ack packet contains a list of the options which the sender is acknowledging.

In order to simplify processing and achieve greater efficiency of processing it is preferable that, as a result of renegotiating the PPP options, the newly negotiated options are the same as the PPP options used prior to renegotiation. However, this is not a requirement. In the event that the newly negotiated PPP options are not the same as the PPP options used prior to renegotiation, the MT2 device would be required to perform additional processing such as described in copending patent application "Selectively Unframing and Framing PPP Packets Depending On Negotiated Options of the Um and Rm Interfaces", inventors Marcello Lioy and Nish Abrol, assigned to the same assignee (attorney docket D1275).

Because the wireless communication (MT2) device 104 is typically mobile, communications between the MT2 device 104 and a BSC/MSC 106 will be handed off to another BSC/MSC 106, as necessary depending on the location of the MT2. Handoff techniques are well known in the art. When a handoff occurs, the PPP $U_m$ interface must be renegotiated. That is, the LCP and the IPCP configuration options must be renegotiated over the $U_m$ interface. However, it is not necessary to renegotiate the PPP configuration options over the $R_m$ interface when the $U_m$ interface is renegotiated.

In the preferred embodiment, the MT2 device will attempt to simultaneously negotiate both the $R_m$ and the $U_m$ interfaces by monitoring the received LCP and IPCP configuration request packets on one of the $R_m$ and $U_m$ interfaces, examining the LCP and IPCP configuration packets, and if the requested options are supported by the MT2 device, transmitting the received LCP or IPCP configuration request packet on the other of the $R_m$ and $U_m$ interfaces.

Figure 1:
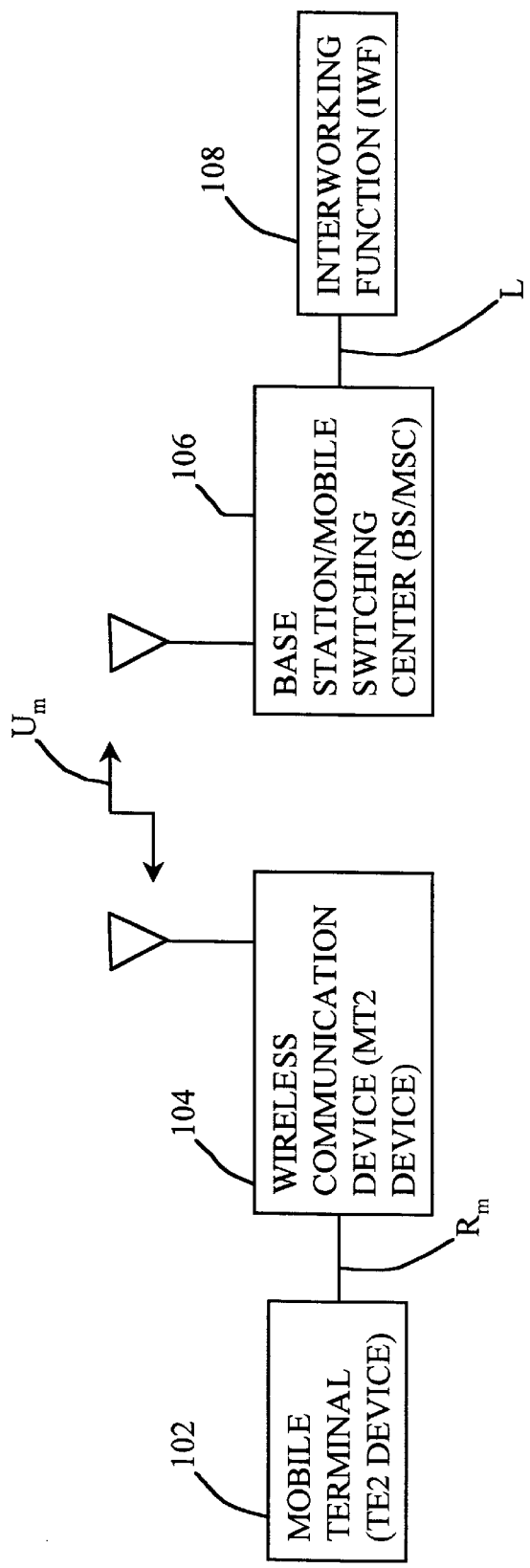
FIG. 1 illustrates a high-level block diagram of a wireless data communication system in which a terminal device connects to a network, such as the Internet, via a wireless communication device.
Figure 2:
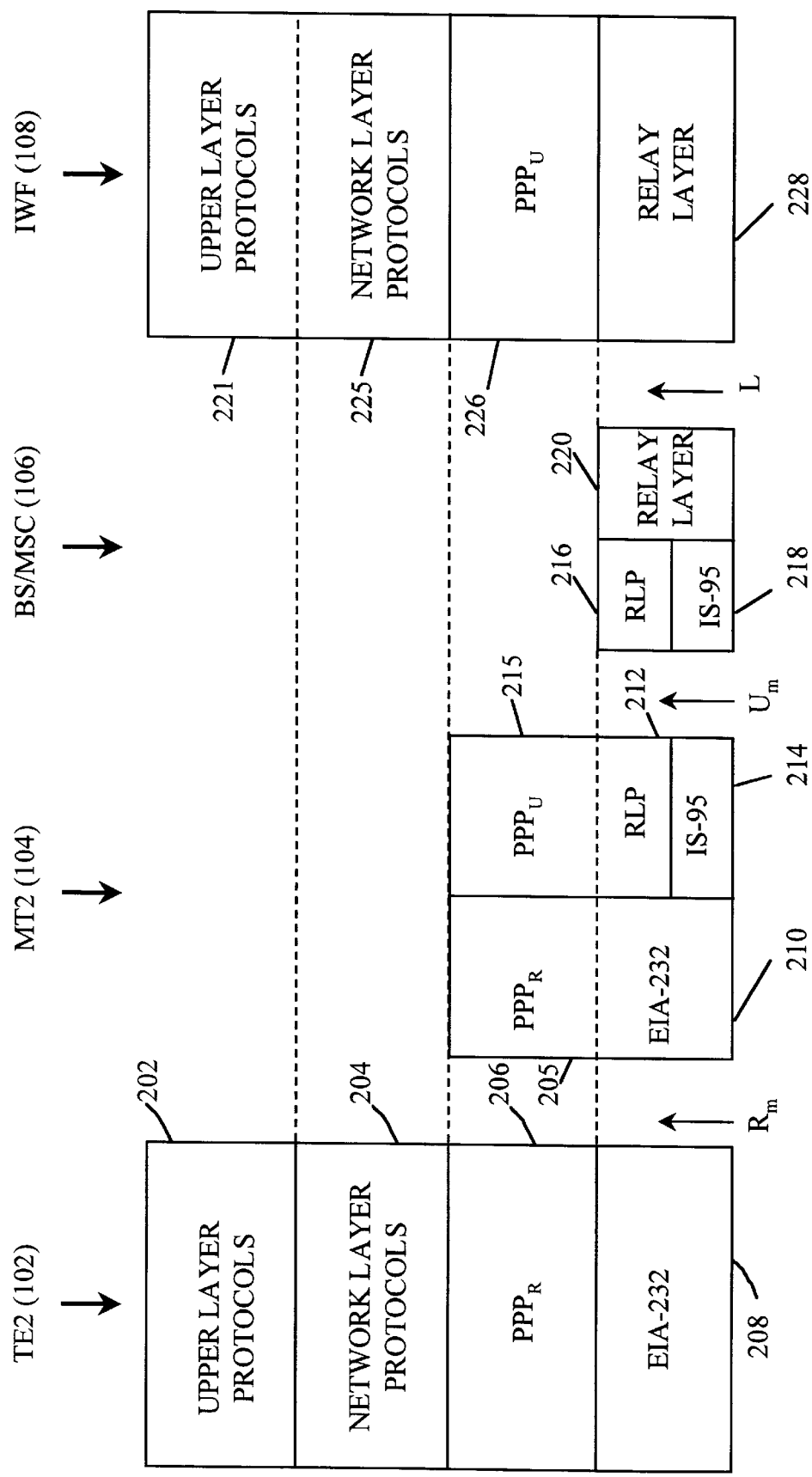
FIG. 2 is a diagram of the protocol stacks of each entity.
Figure 3:
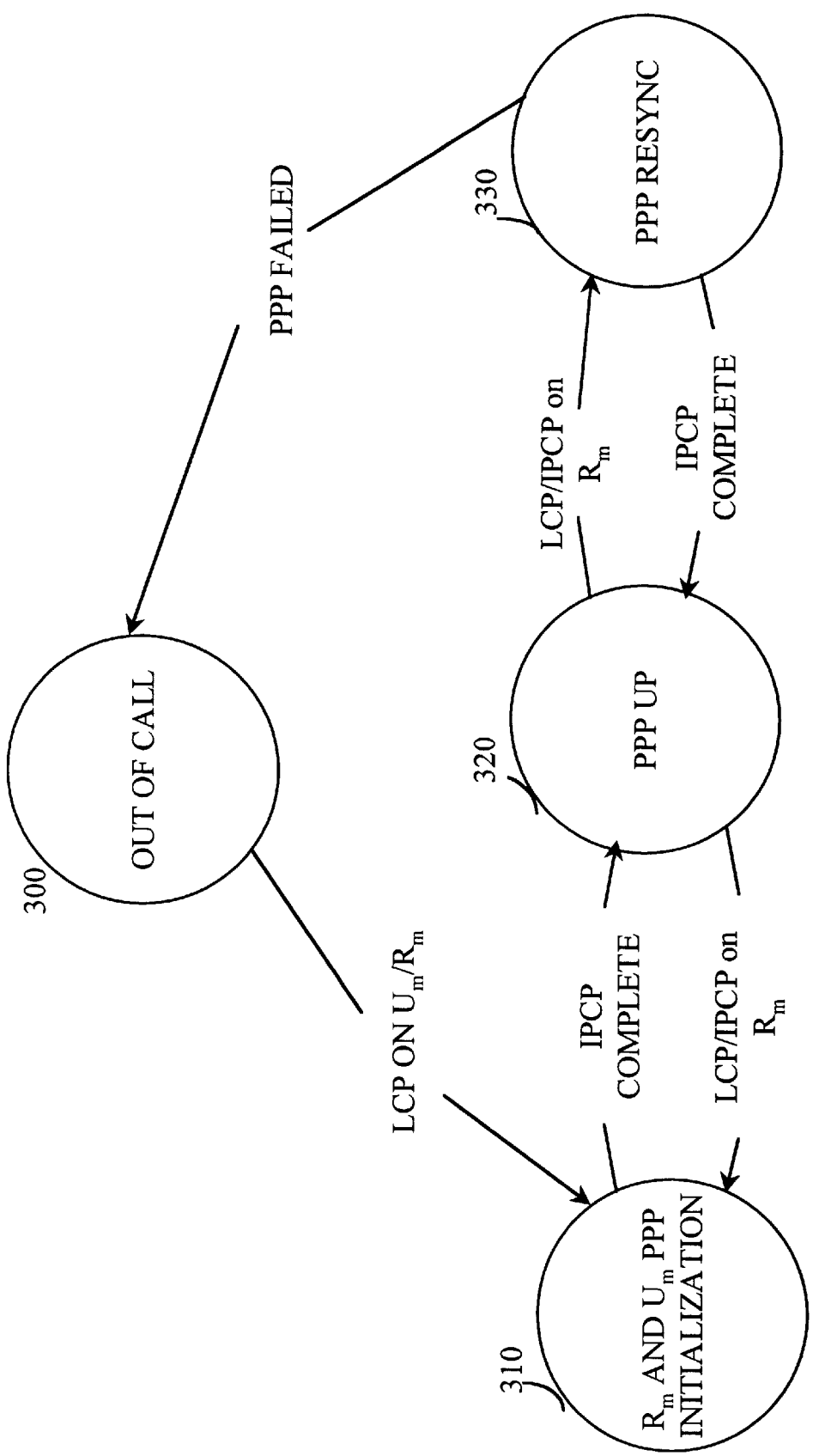
FIG. 3 is a state transition diagram which illustrates the state transitions for a first aspect of a preferred embodiment of the invention.

FIG. 3 illustrates a state transition diagram of a first aspect of the invention. Initially, PPP is in the Out of Call state, shown at reference numeral 300. When an LCP packet is received in the MT2 device 104 from either the $U_m$ or $R_m$ interface, PPP enters the $R_m$ and $U_m$ PPP Initialization state, shown at reference numeral 310. In this state, option negotiation occurs on both the $R_m$ and $U_m$ interfaces. When LCP configuration negotiations are complete, then IPCP configuration negotiations are performed. When IPCP negotiations are completed, PPP enters the PPP Up state, shown at reference numeral 320.

While in the PPP Up state, if an LCP or IPCP Configure-Request packet is received on the $R_m$ interface, PPP enters the $R_m$ and $U_m$ PPP Initialization state, and option negotiations take place on both the $R_m$ and $U_m$ interfaces.

While in the PPP Up state it may be necessary to renegotiate PPP over the $U_m$ link. Indication that this is necessary may come in several forms; it could come from the cellular network, for example, in a CDMA network it could be indicated by a new packet zone ID or new SID/NID. It could also come in the form of an LCP configure request or an IPCP configure request. If the indication comes from the cellular network the $U_m$ PPP in the phone can initiate the renegotiation, otherwise no special action needs to be taken. Upon receiving an indication that renegotiation is necessary the PPP Resync state is entered, shown at reference numeral 330. In the PPP Resync state, the MT2 device 104 will renegotiate the LCP and IPCP options. When IPCP option negotiations are completed, the PPP Up state is again reentered and data transfer may take place.

Figure 4:
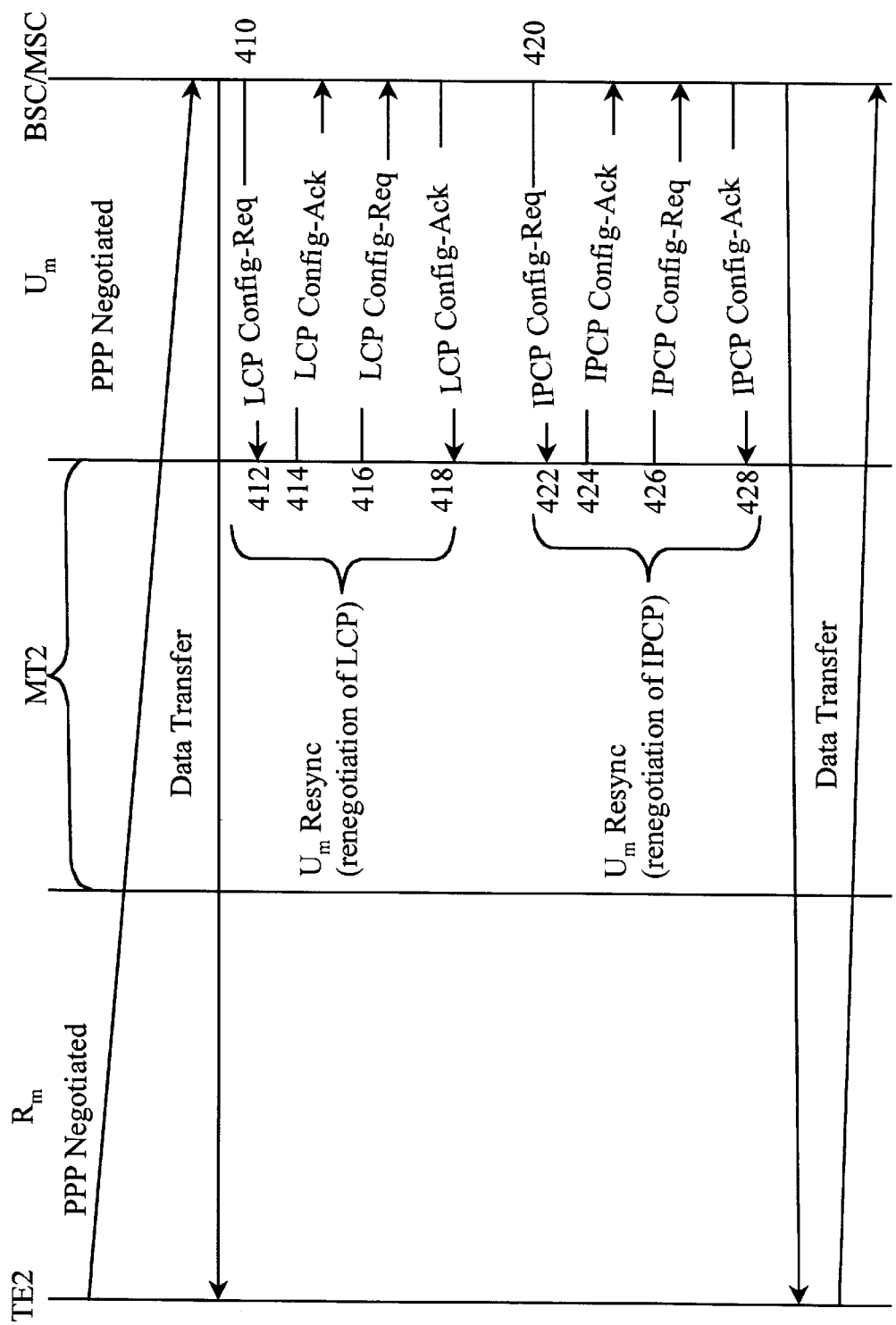
FIG. 4 illustrates the operation of the invention when the $U_m$ interface is renegotiated.

FIG. 4 provides an example of the operation of the present embodiment. After option negotiation is completed on both the $R_m$ and $U_m$ interfaces, data transfer may take place. At reference numeral 410, the BSC/MSC 106 sends an LCP Configure-Request packet, over the $U_m$ interface, to the MT2 device 104. At reference numeral 412, the MT2 device receives the LCP Configure-Request packet while in the PPP Up state, enters the PPP Resync state, and at reference numeral 414, sends a LCP Configure-Ack packet. At reference numeral 416, the MT2 device sends a LCP Configure-Request packet and, at reference numeral 418, the MT2 device receives an LCP Configure-Ack packet from the BS/MSC 106. At this point the LCP configuration options for both ends of the $U_m$ interface have been successfully negotiated. Note that FIG. 4 would have to be modified if the MT2 were to initiate the renegotiation.

At reference numeral 420, the BS/MSC sends an IPCP Configure-Request packet to the MT2 device. At reference numeral 422, the MT2 device receives the IPCP Configure-Request packet and, at reference numeral 424, responds with an IPCP Configure-Ack packet. At reference numeral 426, the MT2 device sends an IPCP Configure-Request packet. At reference numeral 428, the MT2 device receives an IPCP Configure-Ack packet from the BS/MSC. At this point IPCP negotiations are complete and the MT2 device enters the PPP Up state. Thus, the $U_m$ interface has been renegotiated without affecting the $R_m$ interface.

Figure 5:
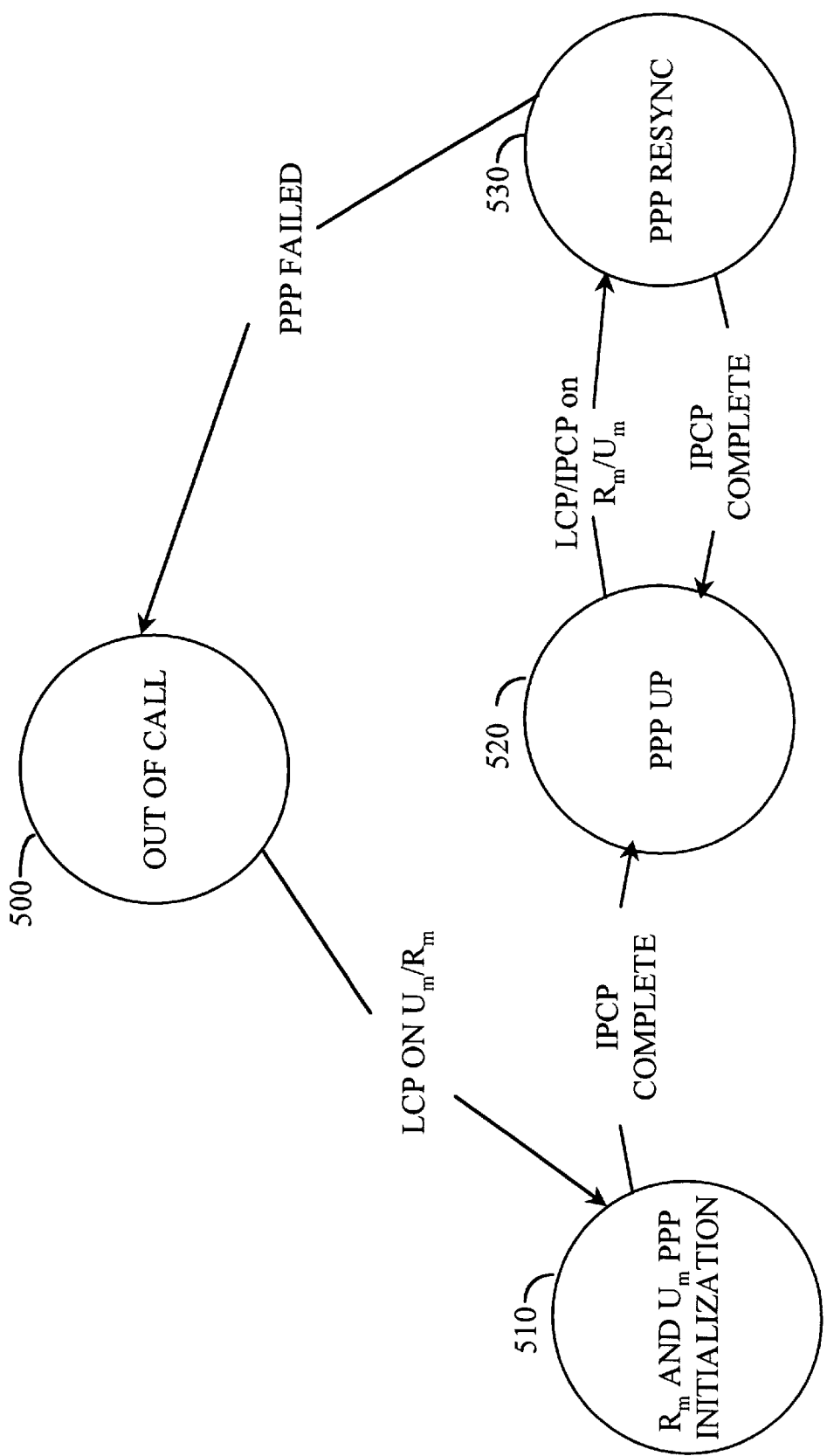
FIG. 5 is a state transition diagram which illustrates the state transitions for a second aspect of a preferred embodiment of the invention.

FIG. 5 illustrates a state transition diagram for a second aspect of the invention. LCP and IPCP option negotiations on one of the $R_m$ and the Un interface do not affect the other of the $R_m$ and $U_m$ interface.

Initially, PPP starts at the Out of Call state, shown at reference numeral 500. When an LCP Configure-Request packet is received on either the $R_m$ or the $U_m$ interface, then PPP enters the $R_m$ and $U_m$ PPP Initialization state, as shown at reference numeral 510. When IPCP option negotiations are completed, PPP enters the PPP Up state, shown at reference numeral 520.

When either an LCP or an IPCP Configure-Request packet are received over the $R_m$ or the $U_m$ interface while in the PPP Up state, then PPP enters the PPP Resync state, shown at reference numeral 530. When IPCP completes option negotiation on the $R_m$ or the $U_m$ interface while in the PPP Resync state, then PPP enters the PPP Up state.

Figure 6:
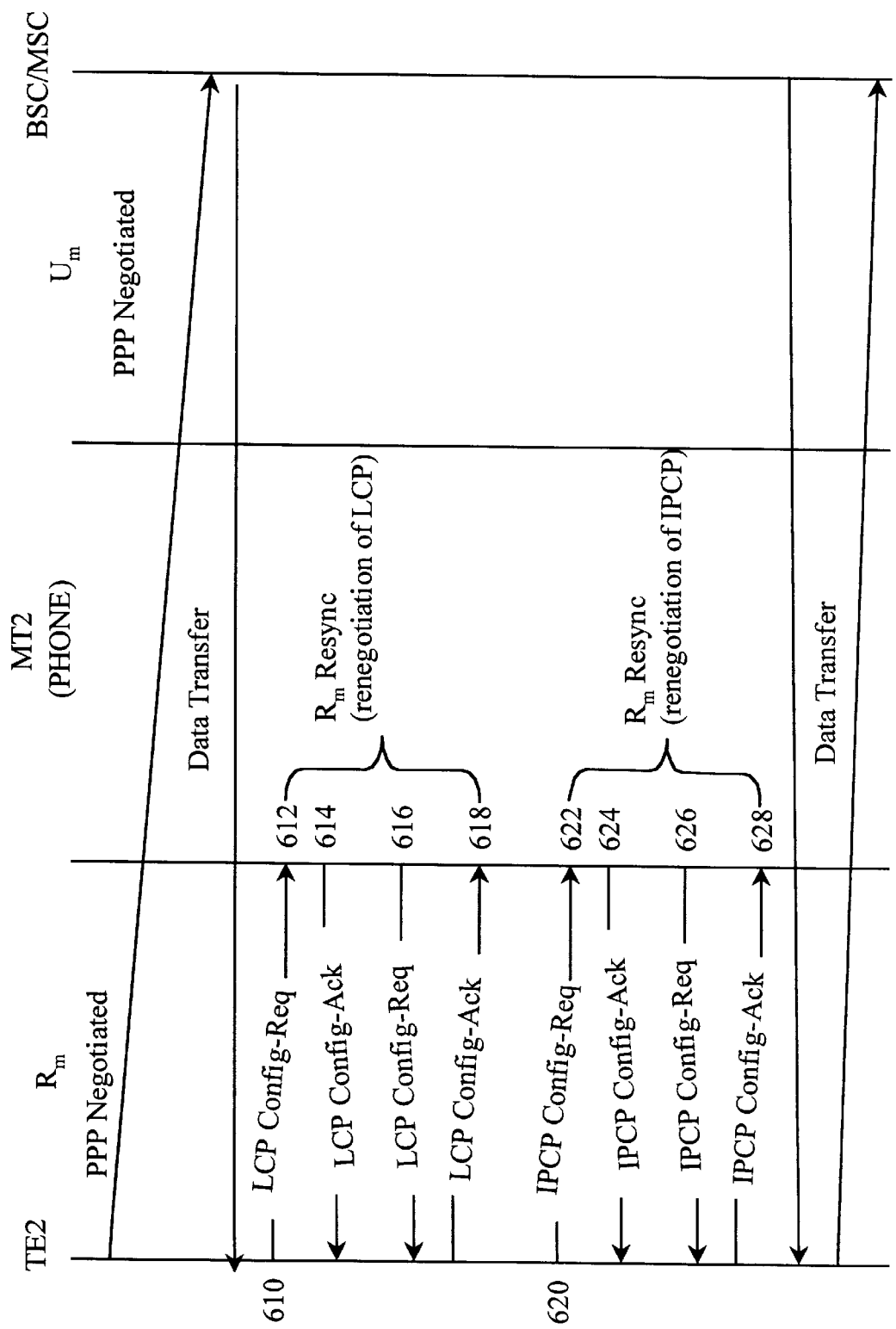
FIG. 6 illustrates the operation of the invention when the $R_m$ interface is renegotiated.

FIG. 6 shows a PPP option negotiation over the $R_m$ interface not affecting the $U_m$ interface. After option negotiation is completed on both the $R_m$ and $U_m$ interfaces, data transfer may take place. At reference numeral 610, the TE2 102 device sends an LCP Configure-Request packet, over the $R_m$ interface, to the MT2 device 104. At reference numeral 612, the MT2 device receives the LCP Configure-Request packet while in the PPP Up state, enters the PPP Resync state, and at reference numeral 614, sends a LCP Configure-Ack packet. At reference numeral 616, the MT2 device sends a LCP Configure-Request packet and, at reference numeral 618, the MT2 device receives an LCP Configure-Ack packet from the TE2 device 102. At this point the LCP configuration options for both ends of the $R_m$ interface have been successfully negotiated.

At reference numeral 620, the TE2 device sends an IPCP Configure-Request packet to the MT2 device. At reference numeral 622, the MT2 device receives the IPCP Configure-Request packet and, at reference numeral 624, responds with an IPCP Configure-Ack packet. At reference numeral 626, the MT2 device sends an IPCP Configure-Request packet. At reference numeral 628, the MT2 device receives an IPCP Configure-Ack packet from the TE2 device. At this point IPCP negotiations are complete and the MT2 device enters the PPP Up state. Thus, the $R_m$ interface options have been negotiated without affecting the $U_m$ interface.

While this invention has been described in connection with what is presently considered to be the preferred embodiment, it is to be understood that the invention is not limited to the disclosed embodiment, but on the contrary, is intended to cover various modifications and equivalent arrangements included within the spirit and scope of the appended claims.

We claim as our invention:

1. A method of resynchronizing a first Point-to-Point Protocol link on a $U_m$ interface without resynchronizing a second Point-to-Point Protocol link on a $R_m$ interface, comprising:
   checking all packets being received by a MT2 device over said $U_m$ interface to determine whether a received packet is a PPP packet for requesting option negotiating;
   negotiating option values of said $U_m$ interface, after said checking determines that said received packet is said PPP packet for requesting option negotiating.

2. The method according to claim 1, wherein a Point-to-Point Protocol on said MT2 device enters a state for data transfer after said negotiating of said option values is successfully completed.

3. The method according to claim 2, wherein said checking is performed when said Point-to-Point Protocol is in said state for data transfer.

4. The method according to claim 1, wherein said negotiating comprises negotiating LCP option values.

5. The method according to claim 1, wherein said negotiating comprises negotiating IPCP option values.

6. The method according to claim 1, wherein said negotiating comprises negotiating LCP option values and IPCP option values.

7. A method of resynchronizing a first Point-to-Point Protocol link without resynchronizing a second Point-to-Point Protocol link, comprising:

checking all packets being received by a MT2 device over one of a $U_m$ interface and a $R_m$ interface to determine whether a received packet is a PPP packet for requesting option negotiating;

negotiating option values of said one of said $U_m$ interface and said $R_m$ interface, after said checking determines that said received packet is said PPP packet for requesting option negotiating.

8. The method according to claim 7, wherein a Point-to-Point Protocol on said MT2 device enters a state for data transfer after said negotiating of said option values is successfully completed.

9. The method according to claim 8, wherein said checking is performed when said Point-to-Point Protocol is in said state for data transfer.

10. The method according to claim 7, wherein said negotiating comprises negotiating LCP option values.

11. The method according to claim 7, wherein said negotiating comprises negotiating IPCP option values.

12. The method according to claim 7, wherein said negotiating comprises negotiating LCP option values and IPCP option values.

13. A MT2 device capable of resynchronizing a first Point-to-Point Protocol link on a $U_m$ interface without resynchronizing a second Point-to-Point Protocol link on a $R_m$ interface, comprising:

means for checking all packets being received over said $U_m$ interface to determine whether a received packet is a PPP packet for requesting option negotiation;

means for negotiating option values of said $U_m$ interface, after said checking means determines that said received packet is said PPP packet for requesting option negotiation.

14. The MT2 device according to claim 13, wherein a Point-to-Point Protocol on said MT2 device enters a state for data transfer after said negotiating means successfully negotiates said PPP options.

15. The MT2 device according to claim 14, wherein said checking means performs checking of all of said packets when said Point-to-Point Protocol is in said state for data transfer.

16. The MT2 device according to claim 13, wherein said option values negotiated by said negotiating means comprises LCP option values.

17. The MT2 device according to claim 13, wherein said option values negotiated by said negotiating means comprises IPCP option values.

18. The MT2 device according to claim 13, wherein said option values negotiated by said negotiating means comprises LCP option values and IPCP option values.

19. A MT2 device capable of resynchronizing a first Point-to-Point Protocol link without resynchronizing a second Point-to-Point Protocol link, comprising:

means for checking all packets being received by a MT2 device over one of a $U_m$ interface and a $R_m$ interface to determine whether a received packet is a PPP packet for requesting option negotiating;

means for negotiating option values of said one of said $U_m$ interface and said $R_m$ interface, after said checking means determines that said received packet is said PPP packet for requesting option negotiating.

20. The MT2 device according to claim 19, wherein a Point-to-Point Protocol on said MT2 device enters a state for data transfer after said negotiating means successfully negotiates PPP options.

21. The MT2 device according to claim 20, wherein said checking means performs checking when said Point-to-Point Protocol is in said state for data transfer.

22. The MT2 device according to claim 19, wherein said option values negotiated by said negotiating means comprises LCP option values.

23. The MT2 device according to claim 19, wherein said option values negotiated by said negotiating means comprises IPCP option values.

24. The MT2 device according to claim 19, said option values negotiated by said negotiating means comprises LCP option values and IPCP option values.

* * * * *

UNITED STATES PATENT AND TRADEMARK OFFICE
CERTIFICATE OF CORRECTION

| | |
|---|---|
| PATENT NO. | : 6,377,556 B1 |
| APPLICATION NO. | : 09/353107 |
| DATED | : April 23, 2002 |
| INVENTOR(S) | : Lioy et al. |

It is certified that error appears in the above-identified patent and that said Letters Patent is hereby corrected as shown below:

Column 6, line 48, please replace existing Claim 1 with the following replacement Claim 1:

1. A method comprising:

checking all packets being received by a MT2 device over a $U_m$ interface, during a first Point-to-Point Protocol link, to determine whether a received packet is a PPP packet for requesting option negotiating; and negotiating option values of the $U_m$ interface, after said checking determines that the received packet is the PPP packet for requesting option negotiating, the negotiating involving resynchronizing the first Point-to-Point Protocol link on the $U_m$ interface without resynchronizing a second Point-to-Point Protocol link on a $R_m$ interface.

Column 7, line 6, please replace existing Claim 7 with the following replacement Claim 7:

7. A method comprising:

checking all packets being received by a MT2 device over one of a $U_m$ interface and a $R_m$ interface, during a first Point-to-Point Protocol link, to determine whether a received packet is a PPP packet for requesting option negotiating; and negotiating option values of the one of the $U_m$ interface and the $R_m$ interface, after the checking determines that the received packet is the PPP packet for requesting option negotiating, the negotiating involving resynchronizing the first Point-to-Point Protocol link on the one of the $U_m$ and the $R_m$ interface without resynchronizing a second Point-to-Point Protocol link on the other of the $U_m$ and the $R_m$ interface.

Column 7, line 31, please replace existing Claim 13 with the following replacement Claim 13:

13. A MT2 device comprising:

means for checking all packets being received over a $U_m$ interface, during a first Point-to-Point Protocol link, to determine whether a received packet is a PPP packet for requesting option negotiation; and means for negotiating option values of the $U_m$ interface, after the checking means determines that the received packet is the PPP packet for requesting option negotiation, the negotiating involving resynchronizing the first Point-to-Point Protocol link on the $U_m$ interface without resynchronizing a second Point-to-Point Protocol link on a $R_m$ interface.

UNITED STATES PATENT AND TRADEMARK OFFICE
CERTIFICATE OF CORRECTION

PATENT NO. : 6,377,556 B1
APPLICATION NO. : 09/353107
DATED : April 23, 2002
INVENTOR(S) : Lioy et al.

It is certified that error appears in the above-identified patent and that said Letters Patent is hereby corrected as shown below:

Column 8, line 16, please replace existing Claim 19 with the following replacement Claim 19:

19. A MT2 device comprising:
    means for checking all pakcets being received by a MT2 device over one of a $U_m$ interface and a $R_m$ interface, during a first Point-to-Point Protocol link, to determine whether a received packet is a PPP packet for requesting option negotiating; and
    means for negotiating option values of the one of the $U_m$ interface and the $R_m$ interface, after the checking means determines that the received packet is the PPP packet for requesting option negotiating, the negotiating involving resynchronizing the first Point-to-Point Protocol link on the one of the $U_m$ and the $R_m$ interface without resynchronizing a second Point-to-Point Protocol link on the other of the $U_m$ and the $R_m$ interface.

Signed and Sealed this

Twenty-fourth Day of October, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,377,556 B1 | Page 1 of 2 |
| APPLICATION NO. | : 09/353107 | |
| DATED | : April 23, 2002 | |
| INVENTOR(S) | : Lioy et al. | |

It is certified that error appears in the above-identified patent and that said Letters Patent is hereby corrected as shown below:

Column 6, line 48, please replace existing Claim 1 with the following replacement Claim 1:

1. A method comprising:
        checking all packets being received by a MT2 device over a $U_m$ interface, during a first Point-to-Point Protocol link, to determine whether a received packet is a PPP packet for requesting option negotiating; and
        negotiating option values of the $U_m$ interface, after said checking determines that the received packet is the PPP packet for requesting option negotiating, the negotiating involving resynchronizing the first Point-to-Point Protocol link on the $U_m$ interface without resynchronizing a second Point-to-Point Protocol link on a $R_m$ interface.

Column 7, line 6, please replace existing Claim 7 with the following replacement Claim 7:

7. A method comprising:

checking all packets being received by a MT2 device over one of a $U_m$ interface and a $R_m$ interface, during a first Point-to-Point Protocol link, to determine whether a received packet is a PPP packet for requesting option negotiating; and
        negotiating option values of the one of the $U_m$ interface and the $R_m$ interface, after the checking determines that the received packet is the PPP packet for requesting option negotiating, the negotiating involving resynchronizing the first Point-to-Point Protocol link on the one of the $U_m$ and the $R_m$ interface without resynchronizing a second Point-to-Point Protocol link on the other of the $U_m$ and the $R_m$ interface.

Column 7, line 31, please replace existing Claim 13 with the following replacement Claim 13:

13. A MT2 device comprising:
        means for checking all packets being received over a $U_m$ interface, during a first Point-to-Point Protocol link, to determine whether a received packet is a PPP packet for requesting option negotiation; and
        means for negotiating option values of the $U_m$ interface, after the checking means determines that the received packet is the PPP packet for requesting option negotiation, the negotiating involving resynchronizing the first Point-to-Point Protocol link on the $U_m$ interface without resynchronizing a second Point-to-Point Protocol link on a $R_m$ interface.

UNITED STATES PATENT AND TRADEMARK OFFICE
CERTIFICATE OF CORRECTION

PATENT NO. : 6,377,556 B1
APPLICATION NO. : 09/353107
DATED : April 23, 2002
INVENTOR(S) : Lioy et al.

It is certified that error appears in the above-identified patent and that said Letters Patent is hereby corrected as shown below:

Column 8, line 16, please replace existing Claim 19 with the following replacement Claim 19:

19. A MT2 device comprising:

means for checking all packets being received by a MT2 device over one of a $U_m$ interface and a $R_m$ interface, during a first Point-to-Point Protocol link, to determine whether a received packet is a PPP packet for requesting option negotiating; and means for negotiating option values of the one of the $U_m$ interface and the $R_m$ interface, after the checking means determines that the received packet is the PPP packet for requesting option negotiating, the negotiating involving resynchronizing the first Point-to-Point Protocol link on the one of the $U_m$ and the $R_m$ interface without resynchronizing a second Point-to-Point Protocol link on the other of the $U_m$ and the $R_m$ interface.

Signed and Sealed this

Nineteenth Day of December, 2006

JON W. DUDAS
*Director of the United States Patent and Trademark Office*